United States Patent Office 3,103,643
Patented Sept. 10, 1963

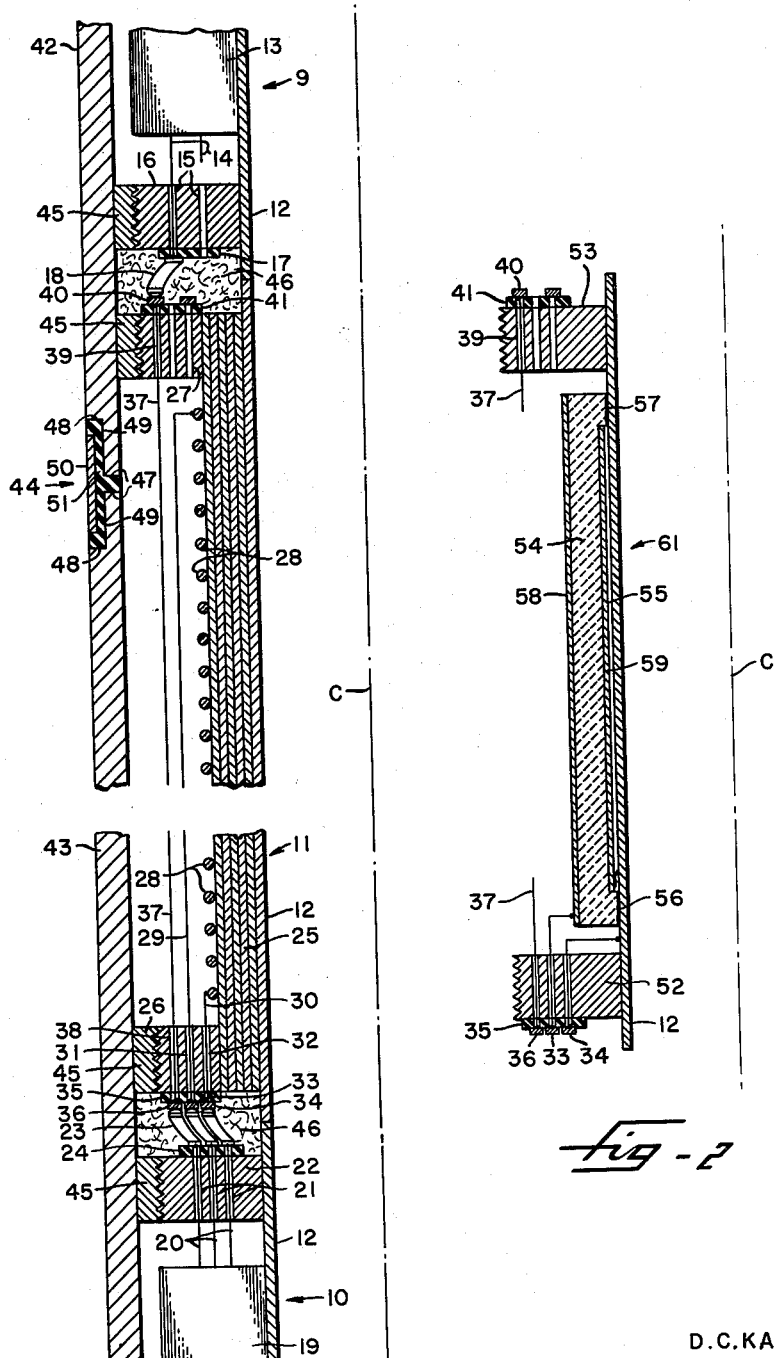

3,103,643
DRILL PIPE MODULE TRANSMITTER TRANSDUCER
David C. Kalbfell, 941 Rosecarns St., San Diego 6, Calif.
Filed June 29, 1960, Ser. No. 39,633
23 Claims. (Cl. 340—17)

This invention relates generally to apparatus for converting electrical signals into acoustic waves in a steel pipe such as used in oil wells and more particularly to a non-resonant drill pipe module transmitter transducer having utility for such purpose.

The drill pipe transmitter transducer of the present invention, although not limited thereto, finds particular application and use in the data collection and transmission system of my copending application for Drill Pipe Module Data Collection and Transmission System, Serial No. 820,680, filed June 16, 1959, now Patent No. 3,015,801. In this copending application, the system disclosed and claimed therein has particular utility for logging-while-drilling operations which involve the sensing of a plurality of parameters of interest near the drill bit in an oil well concurrently with the drilling operation therein, and acoustically transmitting signals indicative of the magnitude of the sensed parameters via the drill pipe in a form suitable for detection and recording at the surface.

In accordance with the data collection and transmission system of my copending application aforesaid, a series of commutated analog signals corresponding to the measured parameters are repetitively transmitted via the drill pipe in frequency modulation or binary number form by means of frequency shift keying in a three frequency system in which frequencies $f_1$ and $f_0$ respectively correspond to the "1" and "0" digit signals and a frequency $f_2$ provides a "space" transmittal between each series of the binary digits forming a binary number and a longer "space" transmittal between each series of transmitted binary numbers to thus indicate at the receiver completion of each cycle of analog voltage measurements.

A magnetic or electronic commutator is employed to increase the number of parameters being measured whereby hole temperature, pressure, mechanical resistance offered by the formation to the drill bit and other parameters may be measured in addition to those customarily measured such as electrical conductivity, the velocity of sound, and the intensity of nuclear radiation of the earth formation.

A signal generator produces the carrier frequencies $f_1$ and $f_0$ by heterodyning frequency $f_2$ with a basic clock frequency $f_c$. Frequency $f_c$ also serves to provide shift pulses required in the analog to digital conversion, commutation, and frequency shift keying. Coherence is maintained between signal frequencies $f_0$, $f_1$ and clock frequency $f_c$ so that the clock frequency may be reconstructed at the receiver by heterodyning the two signal frequencies $f_0$, $f_1$, thus rendering the overall transmitter-receiver system independent of drift in the oscillators comprising the signal generator. Signal frequencies $f_0$, $f_1$, and $f_2$ drive a non-resonant transmitter transducer of a type suitable for the purpose, such as that disclosed and claimed in the present application.

The sensors and associated transmitter circuitry, the transmitter transducer, the batteries, and transponder units are mounted in one or more modules comprising sections of drill pipe each consisting of two concentric cylinders separated about ¾ of an inch. Externally, the drill pipe modules appear similar to any other piece of drill pipe and are handled by the drilling crew in the same manner.

In the aforedescribed transmission of intelligence to the surface of the earth via sound waves in the drill pipe, unique problems are presented in that the transducer must generate frequencies at the lower end of the audible range (or even sub-audible frequencies), but it is impractical to take advantage of transducer resonance due to the very long wave lengths of the sound at these frequencies. Ordinarily, non-resonant transducers are not very efficient, and the present invention therefore is directed particularly to a drill pipe module transmitter transducer in which the various compliances and masses are easily controlled to avoid frictional losses and to minimize power loss at the free end of the pipe.

A further problem arises in that the drill pipe module transmitter transducer must be extremely rugged to withstand the abuse of handling in the oil fields while still being very compliant to permit vibration at the very low frequencies involved. This requires that the compliant portions of the transducer be very soft within a normal elastic range corresponding to that of the transmission frequencies of interest, while being very strong with respect to rupture during transportation, installation, and drilling operations. As otherwise expressed, the vibratory system, including joined sections of drill pipe, must be mass controlled: that is, the stiffness reactance of their compliant joint must be less than the mass reactance of the lower pipe section near the drill bit, the purpose of the compliant joint being to provide static coupling between the two sections of pipe while having a low impedance at the acoustic operating frequency so that the two sections of pipe are nearly floating freely with respect to the vibration.

By means of novel transducer configurations and construction of parts and use of elastic bonding materials having different stiffnesses in different areas of bonding between the parts, the optimum combination of ruggedness, compliance, and hermetic sealing against liquid is achieved while also providing a transducer structure which is readily fabricated and installed in drill pipe.

This is accomplished, in accordance with the principles of the present invention, by the provision of an electromechanical transducer in the form of a drill pipe module comprising two lengths of drill pipe which are bonded together end to end with an acoustically elastic cement and freely vibrated relative to each other at the transmission frequencies of interest by means of an electro-vibratory member such, for example, as a magnetostrictive, electrostrictive, or like member, which bridges the compliant gap between the lengths of pipe and rigidly connects acoustically thereto near the contiguous and adjoining ends thereof.

Magnetostrictive transducers are low impedance devices and may be used advantageously with transistor circuitry. Electrostrictive transducers, on the other hand, are high impedance devices and may best be employed with vacuum tubes. Electrostrictive devices alternately expand and contract at the transmitter signal frequencies applied thereto and, accordingly, the acoustic waves transmitted through the drill pipe by an electrostrictive transducer are at the signal frequencies, these being 49, 50, and 51 cycles per second in the example of my copending application aforesaid. Magnetostrictive devices which are not biased either expand only or contract only on every half cycle of the applied signal frequencies and, accordingly, the frequencies of acoustic waves transmitted through the drill pipe by a magnetostrictive transducer are double those of the signal frequencies, the transmitted waves thus being at 96, 98, and 102 cycles per second for a magnetostrictive transducer operating in the data collection and transmission system of my copending application aforesaid.

As will more fully appear as the description proceeds, provision is made for statically loading the electromechanical transducer during the process of assembling the parts comprising the transducer module. Specifically, in the assembly of a magnetostrictive transducer, the transducer member per se is secured to the lengths of pipe of the module while the same are forced to partially close the compliant gap therebetween. By reason of this arrangement, a transducer member of a type which contracts on application of electrical signals thereto, is initially expanded or pre-loaded when the initial forces on the lengths of pipe are released. The transducer member is thus stressed in the no signal condition and becomes further tensioned as the same is contracted in response to the applied signals. Novel means are also provided for strengthening the mechanical coupling between the pipe sections in the region of the compliant gap therebetween while also enhancing the magnetic characteristics of the flux path across the gap.

Novel means are provided for establishing electrical connections between the battery and electronics modules disposed at opposite ends of the transducer module and for sealing such connections from drill mud which passes through the inner tubular passage provided by these modules in maintaining continuity of the mud channel within the drill pipe.

An object of the present invention is to provide a nonresonant electromechanical transducer for transmitting acoustic waves through drill pipe.

Another object is to provide such a transducer which utilizes bonded sections of drill pipe as parts of the vibratory system.

A further object is to so bond the joint between the transducer pipe sections as to render the same both mechanically strong and acoustically very compliant at the transmission frequencies of interest.

Still another object in a magnetostrictive transducer is to decrease the reluctance of the magnetic path across the compliant gap between the bonded pipe sections in addition to rendering the same both mechanically strong and acoustically compliant.

Yet another object is to provide an electromechanical transducer structure including bonded sections of drill pipe disposed end to end and adaptable for use with magnetostrictive, electrostrictive, and other types of electrovibratory members.

Still another object is to provide a transducer structure having provision for pre-loading the electrovibratory member employed in the vibrator system.

A still further object is to provide a drill pipe module transducer adaptable for coupling to and use with battery, electronics, transponder, and other drill pipe modules.

An additional object resides in the provision of electrical connections between such modules which are compatible with the assembly of the parts into the several modules per se and of the modules into the drill pipe string, as well as being operable under normal conditions of use of the string.

Still other objects, features and advantages of the present invention will become more fully apparent as the description proceeds, reference being had to the accompanying drawings wherein:

FIG. 1 is a sectional view taken through the side wall of the drill pipe string in the vicinity of the battery, transducer, and electronics modules; and FIG. 2 is a similar view of an electrostrictive transducer structure which may be used alternatively with the corresponding magnetostrictive transducer structure disclosed in FIG. 1.

Referring now to the drawings for a more complete understanding of the invention, it will be understood that the pipe structure shown in section therein is annular about the center line C.

In FIG. 1 there is disclosed in operative association with battery and electronics drill pipe modules generally designated 9 and 10, a magnetostrictive drill pipe module transducer generally designated 11 which embodies the principles of the present invention. Each of these modules comprises an inner tube 12 which has the dual purpose of supporting the module structure and parts individual thereto and also serving with the other tubes with which they are axially aligned as the inner channel for the passage of the drill mud through the drill pipe string. For this latter purpose, tubes 12 preferably are formed of a hard and strong light weight metal such, for example, as 304 stainless steel.

Battery module 9 comprises one or more batteries which are schematically disclosed as comprising the box 13 which is supported on its associated tube 12. One or more leads 14 from box 13 extend through suitable openings 15 provided in a threaded ring 16 which is formed of a suitable material such as hard steel. It will be understood that a similar ring is employed at the other end of tube 12 of the battery module and that these rings are suitably secured to the tube as by sweat soldering thereto, using either soft solder or silver solder for the purpose. A suitable strip of electrical insulation 17 is secured to ring 16, and this in turn, carries one or more spring contact fingers 18 to which leads 14 are connected.

Electronics module 10 comprises the various sensors, circuit components and elements which make up the data collection and transmission system disclosed in my copending application aforementioned and these collectively are disclosed schematically as comprising the box 19 which is supported on tube 12 of electronics module 10. Leads 20 from box 19 pass through openings 21 in a supporting ring 22 and connect electrically to spring contact fingers 23 supported on an insulating washer 24 much in the same manner as aforedescribed in connection with the construction and arrangement of parts of the battery module 9.

With reference now to transducer module 11, its supporting tube 12, being non-magnetic stainless steel, serves ideally as the bobbin for magnetostrictive member 25 which, in the form disclosed, is wound about tube 12 into a tape-on toroid which is bonded and heat treated by using the same techniques as in making commercial silicon steel toroidal cores. In this case, however, the material preferably is pure nickel or a suitable magnetostrictive alloy. Threaded rings 26 and 27 of suitable magnetic steel are bonded to core 25, as shown, at the bottom and top thereof, preferably using soft or silver solder as aforedescribed in connection with the supporting rings 16 and 22 of modules 9 and 10.

Magnetostrictive core 25 serves as a bobbin for a winding 28 of copper wire, the end leads 29 and 30 of which are brought out through openings 31 and 32 in ring 26 and connected respectively to slip rings 33 and 34 mounted on an insulation washer 35 secured to ring 26. It will be noted that washer 35 supports a third slip ring 36 which connects to a through lead 37. This lead passes through an opening 38 in ring 26 and also through an opening 39 in ring 27 to make connection with a slip ring 40 mounted on an insulation washer 41 secured to ring 27. Thus, in the assembled arrangement of modules 9, 10 and 11, as shown, a battery lead 14 connected to contact finger 18 in contact with slip ring 40, connects to lead 37, and lead 37 by reason of its connection to slip ring 36 in contact with a spring finger 23, makes connection through the connected lead 20 with the electronic gear 19. Winding 28 through its slip rings 33 and 34 in contact with the associated spring fingers 23 also makes appropriate connection with electronic gear 19 in a similar manner.

The module support rings 16, 22, 26, and 27 are externally threaded as aforenoted to facilitate assembly of the modules into the drill pipe which, as disclosed, comprises upper and lower pipe sections 42 and 43, respectively, which are disposed end to end and coupled together mechanically and acoustically by means of a compliant bond therebetween generally designated 44 and sometimes referred to herein as a compliant gap. Pipe sections 42 and 43 have internal threaded bosses 45 adapted for threaded engagement with the threaded support rings of the modules 9, 10 and 11, the bosses being suitably secured to the pipe sections as by welding thereto or may be formed integrally therewith when this is desired.

The compliant gap 44 plays a vital role in the construction and operation of the drill pipe module transmitter transducer of the present invention since it not only provides structural integrity for the joined pipe sections 42 and 43 but permits the same to be vibrated relative to each other in response to contraction of the nickel tube 25 when current flows through winding 28. Since nickel only contracts, external forces are applied to the pipe sections to initially compress compliant gap 44 when the threads are cut in the bosses 45, and the gap is again similarly compressed when the transducer module is screwed into place. After releasing the external forces, the resiliency of the material in gap 44 places the nickel tubing under initial tension to thus pre-load or statically tension the same. Upon application of the electric signal current to the winding 28, the nickel tube 25 is further tensioned as the same contracts magnetostrictively in response to the current, but the static loading is predetermined such that the tube is never unstressed completely during free vibration of the vibratory system.

Prior to screwing transducer module 11 into the drill pipe, the threaded surfaces of bosses 45 to be engaged by the corresponding threaded surfaces of rings 26 and 27 are coated with a suitable adhesive material such as epoxy resin which becomes rigid upon final curing. Thus, the acoustic rigidity of the coupling between transducer module 11 and pipe sections 42 and 43 is not susceptible to possible looseness at the threads but is finally determined by the rigidity of the bonding cement on the threads.

The spring fingers and slip rings naturally rotate into contacting engagement and supporting tubes 12 naturally rotate into abutting engagement end to end as the modules are screwed into assembled relation within the drill pipe. As tubes 12 thus become abutted, closed chambers 46 are formed about the contacted spring fingers and slip rings. These chambers are packed with a suitable sealant such, for example, as silicone grease which thus prevents seepage of the drill mud interiorly of the modules.

Although modules 9, 10, and 11 have been disclosed as being mounted, all three, in joined pipe sections 42 and 43, each of the modules may be mounted in separate pipe units which are coupled together into the drill pipe string in the usual manner. The transducer pipe unit, however, necessarily would include the joined pipe sections 42 and 43, as before.

Referring now per se to the compliant gap 44, it will be seen that the confronting ends of pipe sections 42 and 43 each have horizontal or transverse washer-like surfaces 47 and 48 which are joined by a longitudinally extending cylindrical surface 49. Bridging across surfaces 47 and extending in spaced parallel relation to surfaces 49 and into spaced relation to surfaces 48 is a band 50 formed of ferromagnetic material. The space between surfaces 47 and between band 50 and surfaces 48 and 49 is filled with a suitable elastic adhesive material 51 such, for example, as high temperature epoxy resin or silicone rubber. The epoxy adhesives afford tremendous bonding strength but, unlike that obtainable from silicone rubber, this suffers from extremes of heat.

Compliant gap 44 must have great enough ultimate strength to prevent the lower section 43 of the drill pipe from breaking away from the upper section 42 due to rough handling or due to shock loads during the drilling operation. Due to the limited wall thickness of the drill pipe, the total cross sectional area available for bonding is insufficient for any reliance to be placed on the tensile strength of the adhesive alone. This would require a degree of tensile strength which is not obtainable in the present state of the adhesive art. By use of the band 50 advantage is taken of the shear strength of the adhesive and the bonding area is increased.

In forming the bond between the pipe sections, the surfaces 47, 48 and 49 are coated with the adhesive and the band 50 is affixed by adhesion to surfaces 48 and 49. Band 50 need not be continuous but may be assembled in circumferential sections, for example, and held in place during curing of the adhesive by means of a strap, or the like. The portions of the adhesive between surfaces 47 and between the ends of band 50 and surfaces 48 will be in tension and compression. The portions of the adhesive between surfaces 49 and the inner surface of band 50, however, will be in shear, and the ultimate strength of the bonded joint between the pipe sections will depend upon the shear strength of the adhesive in the region of surfaces 49.

Surfaces 49 may extend to such length on the pipe as needed to give enough surface area so that the shear strength of the adhesive is not exceeded for the most severe shock to be encountered in service. The only limitation on the area of contact between band 50 and surfaces 49 is that the total stiffness reactance of this joint should be less than or equal to the mass reactance looking into the lower section 43 and the upper section 42 of the drill pipe at the acoustical operating frequency. Since this stiffness is a function of the thickness of the adhesive line along the surfaces 49 as well as of the area of this adhesive surface, suitable process control can generally produce the right combination of ultimate tensile strength with acoustical elasticity. Gap 44 is located near the top of transducer module 11 so as to have as much mass as possible in the lower drill pipe section 43. This will tend to minimize power loss at the free end of the drill pipe.

In FIG. 2 there is disclosed an electrostrictive transducer generally designated 61 which is interchangeable with transducer 11 of FIG. 1. Transducer 61 comprises support rings 52 and 53 which are generally similar to rings 26 and 27 of module 11 and secured to stainless steel support tube 12 in the same manner. Transducer 61 also comprises a vibratory member in the form of a ceramic barium titanate ($BaTiO_4$) ring 54 whose inner surface is undercut as at 55 to facilitate mounting of the same on tube 12, there remaining ridges which are bonded as at 56 and 57 with an acoustically stiff adhesive bond material such as a suitable epoxy adhesive. Bonded tube 12 is connected to one electrode 59 of the electrostrictive transducer and this is connected electrically, as shown, to slip ring 34. The other electrode 58 comprises a metal sheet 58 which is bonded or otherwise suitably secured to the outer surface of ring 54 and electrically connected, as shown, to slip ring 33. Tube 12 is thin enough between 56 and 57 to add negligible acoustical stiffness.

From the foregoing it should now be apparent that a drill pipe module transmitter transducer has been provided which is well adapted to fulfill the aforestated objects of the invention. It is to be understood, however, that the invention may be embodied in other forms or carried out in other ways without departing from the spirit or essential characteristics thereof. The embodiments hereinbefore disclosed therefore are to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A drill pipe module transmitter transducer comprising, in combination, two sections of drill pipe disposed end to end, a mechanically strong and elastic compliant gap connection between said sections which affords structural integrity to the connected sections while also rendering the same acoustically compliant at the transmission frequencies of interest, and an electrovibratory member which bridges the compliant gap connection between said pipe sections and connects rigidly acoustically to said sections on each side of said gap connections.

2. A transducer as in claim 1, said electrovibratory member comprising a magnetostrictive device and a winding wound on said magnetostrictive device.

3. A transducer as in claim 2, said magnetostrictive device comprising a tape wound core of magnetostrictive material.

4. A transducer as in claim 3, said core having a non-magnetic bobbin which also forms a channel for passage of drill mud through said connected pipe sections.

5. A transducer as in claim 3, said core near each end thereof having a ring of magnetic material secured thereto, said ring having exterior threads, said pipe sections respectively having rings of magnetic material secured thereto interiorly thereof, said pipe section rings having interior threads and disposed for threaded engagement respectively with the exterior rings of the core.

6. A transducer as in claim 5, said threads being coated with an acoustically rigid adhesive.

7. A transducer as in claim 5, said threads of said pipe section rings having a preformed relation with respect to a predetermined compression of said elastic connection between said pipe sections, and said core rings and pipe section rings having a prejoined threadedly engaged relation with respect to said predetermined compression of said elastic connection whereby the core is tensioned between said rings in the normal uncompressed condition of said elastic connection.

8. A transducer as in claim 1, said sections being disposed above and below said gap connection respectively and said elastic compliant gap connection having a stiffness reactance less than or equal to the mass reactance looking into said upper and lower sections at said acoustical transmission frequencies.

9. A transducer as in claim 1, said elastic compliant gap connection comprising an adhesive coating between confronting end surfaces of said pipe sections.

10. A transducer as in claim 1, said elastic compliant gap connection comprising a rigid structural band which bridges the gap between spaced confronting end surfaces of said pipe sections and extends longitudinally thereof in spaced parallel relation to longitudinally extending surfaces of the sections, and an adhesive coating which bonds said band to said longitudinally extending surfaces of said pipe sections.

11. A transducer as in claim 10, said longitudinally extending surfaces being extended sufficiently and said coating having sufficient thickness to provide a stiffness and shear strength of said adhesive bond which exceeds the shock forces encountered in the service of said transducer, said pipe sections being disposed above and below said gap respectively and said stiffness of said adhesive bond being sufficient to provide a stiffness reactance which is less than or equal to the mass reactance looking into said upper and lower sections at said acoustical transmission frequencies.

12. A transducer as in claim 11, said gap being located near the connection of said electrovibratory member to said upper section and remote from the connection of said member to said lower section to maximize the mass in the lower section.

13. A transducer as in claim 10, said electrovibratory member comprising a core of magnetostrictive material and a winding wound on said core, said structural band being formed of magnetic material, and the acoustically rigid connections of said electrovibratory member to said pipe sections being formed of magnetic material to provide a low reluctance magnetic path for fluxes set up therein in response to electric current passed through said winding.

14. A transducer as in claim 1, said electrovibratory member comprising an electrostrictive device.

15. A transducer as in claim 14, said electrostrictive device comprising a ring of ceramic barium titanate and a central metallic tube having said ceramic ring bonded thereto, said tube serving as an electrode for said ring and as a channel for passage of drill mud through said connected pipe sections, said ring having a second metallic electrode bonded to the outer cylindrical surface thereof, and means for connecting the ends of said tube rigidly acoustically to said pipe sections on opposite sides of said gap.

16. A vibratory system comprising two lengths of drill pipe coupled together end to end with structural integrity and compliantly for free vibration relative to each other at acoustic frequencies of interest, and electromechanical means coupled rigidly acoustically to said lengths of pipe near to one and far from the other of the confronting end portions of said lengths of pipe for vibrating the same at said frequencies.

17. A vibratory system as in claim 16, said pipe end portions being of reduced outer diameter whereby the same together form an external annular recess, an adhesive coating between the confronting end surfaces of said pipe end portions and comprising a compliant transverse gap therebetween, and structure means disposed within said recess and adhesively bonded to said pipe sections in bridging relation to said gap.

18. Drill pipe structure of the character disclosed comprising, in combination, upper and lower pipe sections coupled together end to end with structural integrity and compliantly at acoustic frequencies of interest, an electronics module disposed within said lower section, a battery module disposed within said upper section, a transducer module disposed within said pipe sections between said electronics and battery modules, supporting tubes individual to said modules and aligned with respect to each other within said pipe sections and comprising a central channel for the passage of drill mud therethrough, a pair of nearly closed chambers formed by said tubes between said modules, mutually slidable electrical contact means individual to said chambers and disposed therewithin and connected respectively to the modules adjacent thereto, a sealant packed within each of said chambers to seal against seepage of the drill mud into the modules, means on said pipe sections and complementary means on said modules for mounting and assembling the same within said sections, an electromechanical transducer device individual to said transducer module and rigidly connected acoustically by said complementary mounting means to said pipe sections in bridging relation to said coupled ends thereof.

19. Drill pipe structure as in claim 18, said electrical connections comprising slip rings and engaging spring contact fingers.

20. Drill pipe structure as in claim 18, said complementary mounting means comprising means for pre-loading said transducer device.

21. A drill pipe module transmitter transducer comprising, in combination, two sections of drill pipe disposed end to end, a mechanically strong and elastic compliant gap connection between said sections which affords structural integrity to the connected sections while also rendering the same acoustically compliant at the transmission frequencies of interest, and a magnetostrictive core tensioned in bridging relation to said compliant gap connection between said pipe sections and connected rigidly acoustically at the ends thereof to said pipe sections on opposite sides of said gap connection.

22. A transducer as in claim 21, said pipe sections being disposed vertically above and below said gap respectively, the upper and lower ends of said core being located respectively near to and remote from said gap to maximize the mass in the lower section, said elastic connection at said transmission frequencies having a stiffness reactance less than or equal to the mass reactance of said lower section.

23. A transducer as in claim 22, and further comprising a winding wound on said core for receiving electrical signals at one half said transmission frequencies to further tension said core each half cycle of said signals.

References Cited in the file of this patent
UNITED STATES PATENTS
2,810,546    Eaton _____ Oct. 22, 1957